United States Patent [19]
Förster et al.

[11] 3,882,740
[45] May 13, 1975

[54] PROCESS FOR CONTROLLING THE WORKING OIL PRESSURE AS A FUNCTION OF ENGINE TORQUE FOR SHIFTING ELEMENTS OF AUTOMATICALLY SHIFTED TRANSMISSIONS, ESPECIALLY FOR MOTOR VEHICLES

[75] Inventors: Hans-Joachim M. Förster; Hans Steinbrenner; Georg Eltze, all of Stuttgart; Hans-Jörg Florus, Goppingen, all of Germany

[73] Assignee: Daimler-Benz Aktiengesellschaft, Stuttgart, Germany

[22] Filed: June 30, 1972

[21] Appl. No.: 268,112

[30] Foreign Application Priority Data
June 30, 1971 Germany............................ 2132397

[52] U.S. Cl................ 74/866; 74/752 A; 74/752 D
[51] Int. Cl................................. B60k ; F16h 3/74
[58] Field of Search............. 74/866, 752 A, 752 D; 123/117 R, 117 A

[56] References Cited
UNITED STATES PATENTS

| | | | |
|---|---|---|---|
| 3,440,904 | 4/1969 | Kelbel............................ | 74/866 X |
| 3,521,611 | 7/1970 | Finch........................ | 123/117 R X |
| 3,640,156 | 2/1972 | Mori et al............................ | 74/866 |
| 3,667,322 | 6/1972 | Noguchi et al......................... | 74/731 |
| 3,702,572 | 11/1972 | Wakamatsu et al. ................. | 74/866 |
| 3,718,126 | 2/1973 | Oishi et al........................ | 123/117 R |
| 3,719,096 | 3/1973 | Sprague et al.................... | 74/866 X |
| 3,726,157 | 4/1973 | Marumo ........................ | 74/866 X |
| 3,732,755 | 5/1973 | Beig et al...................... | 74/752 A X |
| 3,741,042 | 6/1973 | Ravenel............................ | 74/866 X |
| 3,752,011 | 8/1973 | Casey et al. ........................ | 74/731 |
| 3,783,847 | 1/1974 | Kolody........................ | 123/117 A X |
| 3,799,136 | 3/1974 | Korteling................... | 123/117 R X |

OTHER PUBLICATIONS
"Electronics," September 11, 1972, pp. 121–125, M. Williams.

*Primary Examiner*—Samuel Scott
*Assistant Examiner*—Lance W. Chandler
*Attorney, Agent, or Firm*—Craig & Antonelli

[57] ABSTRACT

A method and apparatus for controlling the working oil pressure as a function of torque for shifting elements of automatically shifted change-speed transmissions, in which electric logic circuit networks are provided between the shifting elements and transmitter means producing characteristic values representative of function magnitudes such as engine rotational speed, etc.

34 Claims, 16 Drawing Figures

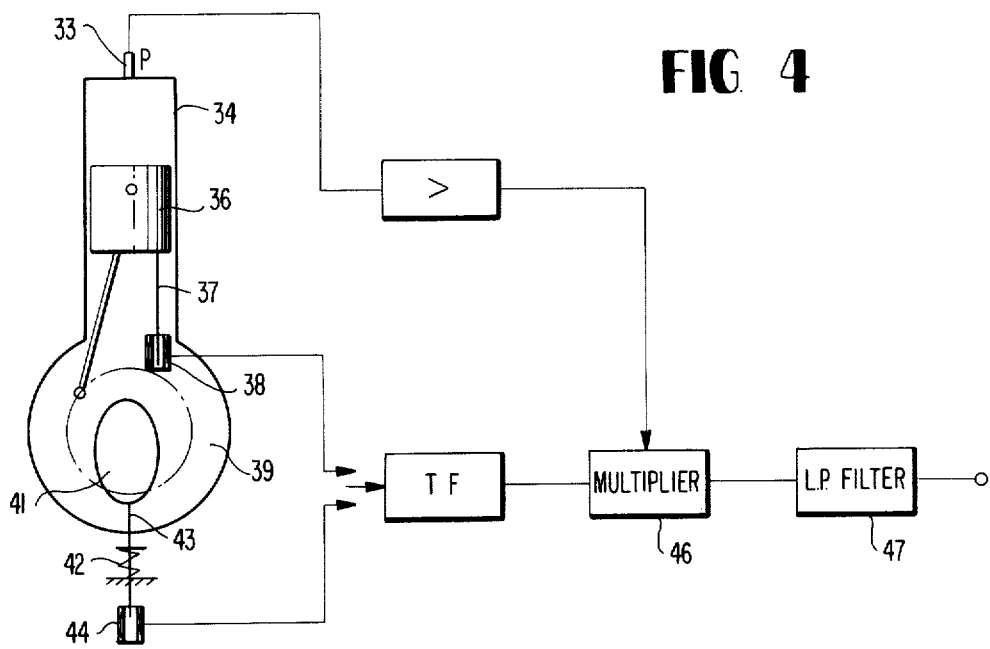
FIG. 4
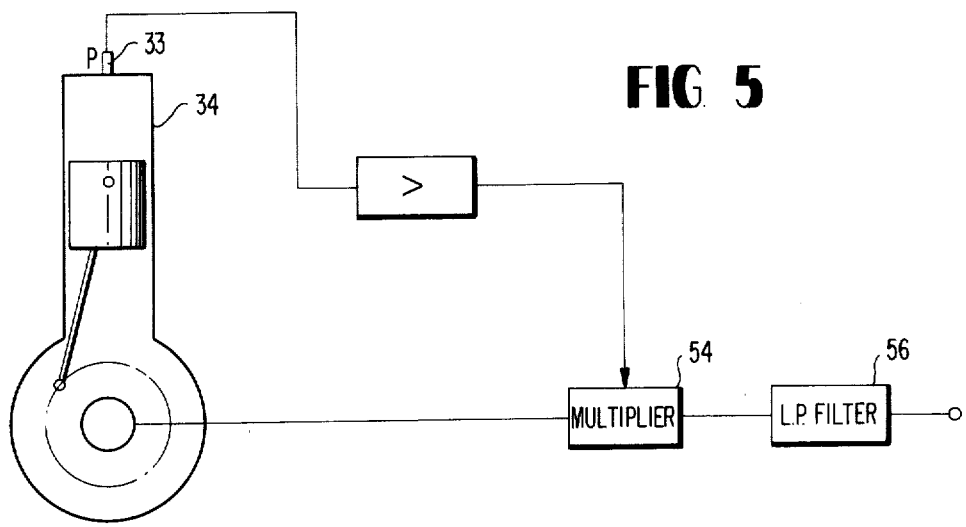
FIG. 5
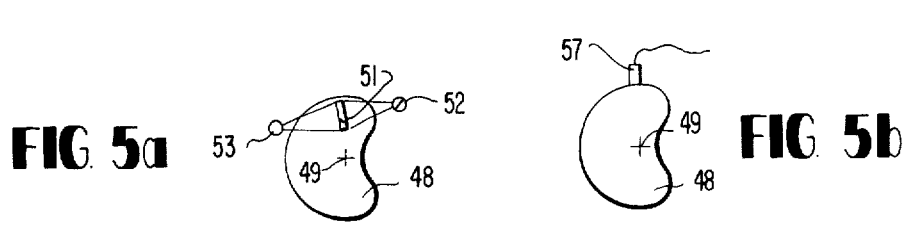
FIG. 5a   FIG. 5b

PROCESS FOR CONTROLLING THE WORKING OIL PRESSURE AS A FUNCTION OF ENGINE TORQUE FOR SHIFTING ELEMENTS OF AUTOMATICALLY SHIFTED TRANSMISSIONS, ESPECIALLY FOR MOTOR VEHICLES

The present invention relates to a method for the control of the working oil pressure as a function of the torque for shifting members of automatically shifted change-speed transmissions, especially for motor vehicles. It furthermore relates to an apparatus for carrying out such a method.

It is known to deduce from the position of the gas pedal the torque and derived therefrom to control the working oil pressure. However, this prior art solution produces a jolt-free or jerk-free shifting only under quite specific conditions. Another prior art solution resides in rendering the working oil pressure dependent on the vacuum in the suction pipe. However, this manner of adaptation is also only approximate because, for example, the absolute air pressure is not taken into consideration in the adaptation. On the other hand, the transmission should shift just as well at sea level as in mountainous terrain. This prior art solution entails especially within the range of small as also of very high rotational speeds large deviations from the desired matching or adaptation.

What has been said hereinabove, is also valid for automatic transmission with a hydraulic starting coupling connected in the input thereof. If, however, a torque converter is used in lieu of the hydraulic starting coupling, then there exists additionally the task to match the working oil pressure to the output torque of the torque converter. It is known in such cases to utilize for the control of the working oil pressure, the pressure of the controller which supplies, as is known, an output pressure that is dependent on the driven rotational speed.

It is the aim of the present invention to provide an apparatus of the aforementioned type, by means of which one can so control the working oil pressure of the shifting members that the change-speed transmission, i.e., the transmission with discrete steps of transmission ratios shifts practically jolt-free or shock-free.

The underlying problems are solved according to the present invention in that electrical logic element networks are provided between the shifting members and characteristic value transmitters of function magnitudes such as torque, driven or output rotational speed of the transmission, engine rotational speed, transmission oil temperature, etc. In one embodiment according to the present invention, the torsion of the crankshaft is measured for detecting the torque and the measured value is fed into the electric logic element circuit connection together with the other function magnitudes. Another possibility resides in that for detecting the torque, the working pressure in at least one cylinder as well as the piston travel are measured, both measured values are electrically connected together for the formation of a $p_{mi}$ value and this value is fed to the electrical logic circuit connection together with the other function magnitudes.

It becomes possible thereby to make the working oil pressure dependent on further factors. For example, the working oil pressure can be controlled by the transmission oil temperature so that one is able in this manner to compensate for the temperature-dependence of the friction coefficients in the shifting elements. One is also able thereby to control shifting operations at high rotational speeds under certain circumstances with higher pressures. In this manner, the stresses and wear of the shifting elements can be reduced. Furthermore, consideration can then be given whether one desires to drive in a sporty manner and is therefore more willing to accept a jerk or jolt or whether one desires to drive more comfortably and therefore more shock-free.

Accordingly, it is an object of the present invention to provide a method and apparatus for controlling the working oil pressure for shifting elements of automatically controlled change-speed transmissions, especially for motor vehicles, which avoids by simple means the aforementioned shortcomings and drawbacks encountered in the prior art.

Another object of the present invention resides in a method and apparatus for controlling the working oil pressure for the shifting elements of automatically shifted change-speed transmissions which permits proper matching of the shifting conditions to the characteristic values of the considered parameters.

A further object of the present invention resides in a method and apparatus for controlling the working oil pressure for shifting elements of automatically shifted change-speed transmissions which is simple in construction, relatively inexpensive in manufacture and installation and reliable in operation.

These and further objects, features, and advantages of the present invention will become more apparent from the following description when taken in connection with the accompanying drawing which shows, for purposes of illustration only, several embodiments in accordance with the present invention and wherein;

FIG. 4 is a schematic diagram, partially in block diagram, of an apparatus in accordance with the present invention for determining the torque for indicated pressure and piston travel;

FIG. 5 is a schematic view, partially in block diagram, of an apparatus in accordance with the present invention for determining the torque from the indicated pressure and crankshaft angle;

FIG. 5a is a schematic view of one embodiment for determining the angular position of the crankshaft in accordance with the present invention;

FIG. 5b is a schematic view of a modified embodiment of a device for determining the angular position of the crankshaft in accordance with the present invention;

Figure 6:
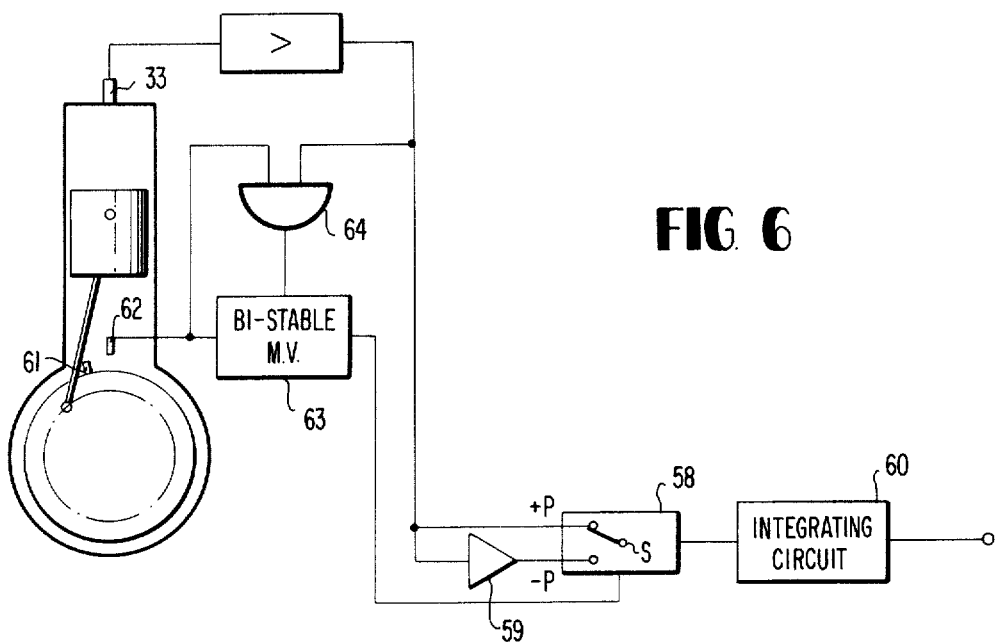
FIG. 6 is a schematic view, partially in block diagram, of an apparatus in accordance with the present invention for the approximate determination of the torque from the indicated pressure and crankshaft position.
Figure 6A:
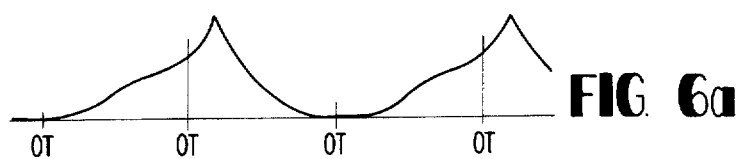
Figure 6B:
Figure 6C:
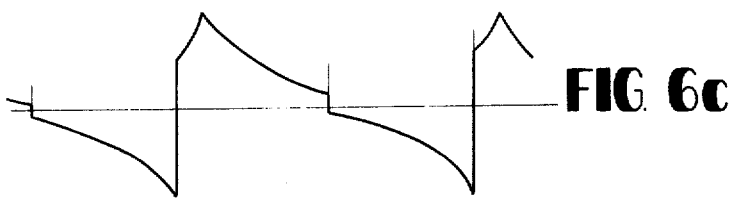
Figure 7:
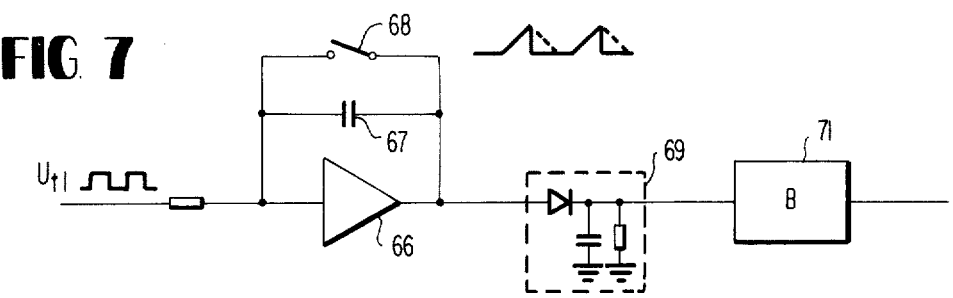
Figure 8:
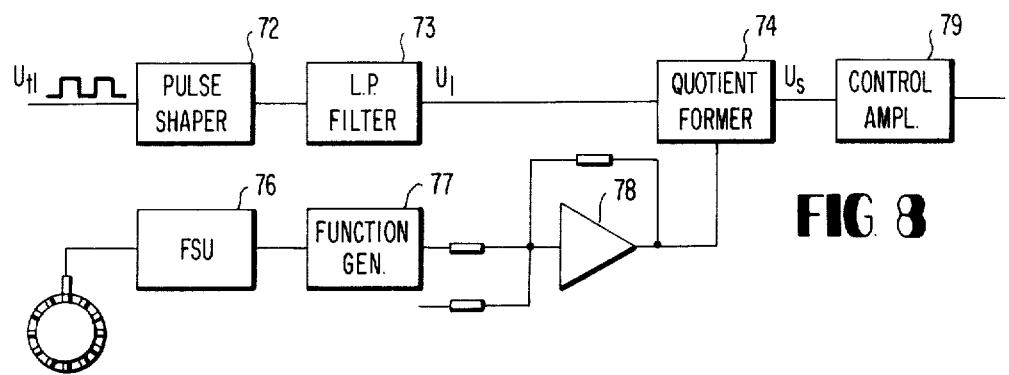
Figure 9:
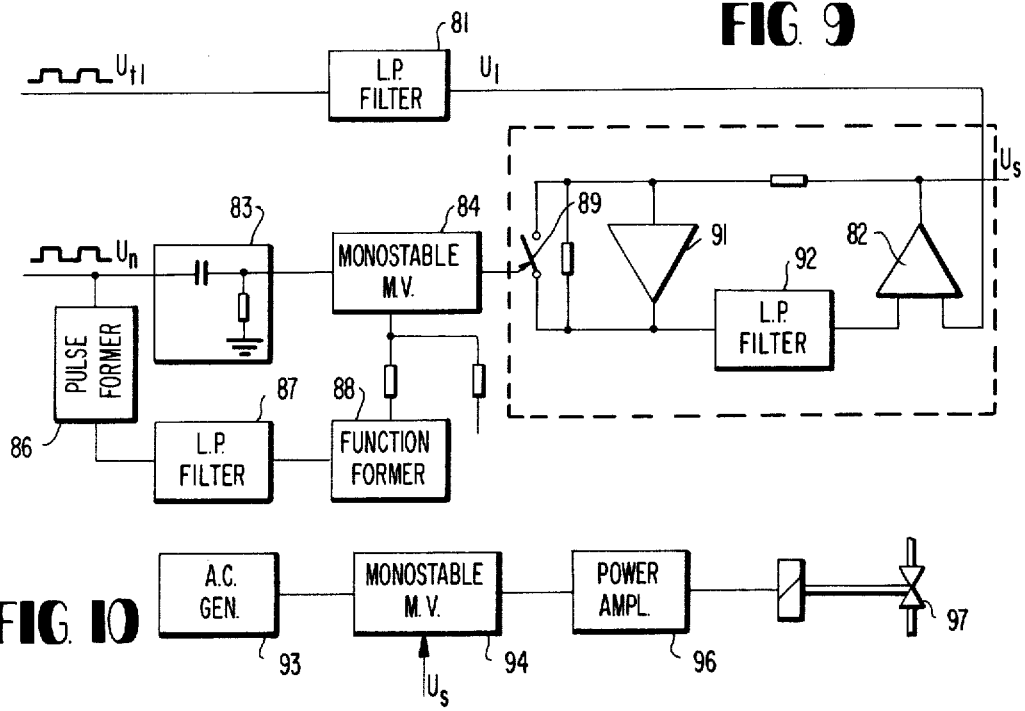
Figure 10:
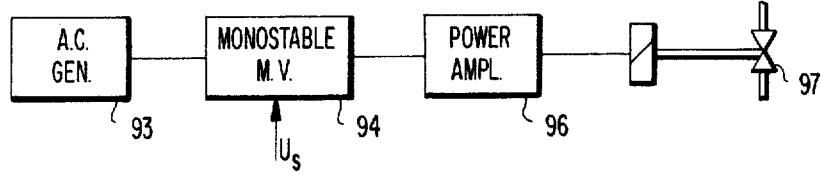
Figure 11:
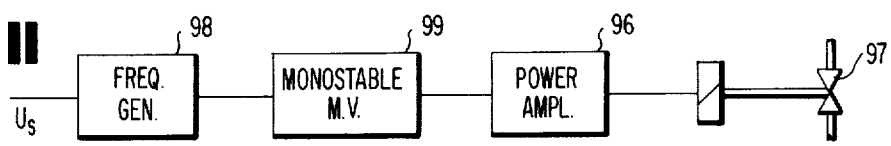

FIGS. 6a, 6b, and 6c are diagrams indicating the waveforms obtained in the electrical system of FIG. 6;

FIG. 7 is a schematic circuit diagram, partially in block diagram, of an apparatus in accordance with the present invention for determining the torque from the control pulses of an electronic injection system;

FIG. 8 is a schematic block diagram of a modified embodiment in accordance with the present invention for determining the torque from the pulses for the control of an electronic injection system, the engine rotational speed and possible additional magnitudes;

FIG. 9 is a block diagram of a particular circuit for the quotient formation from the injection pulses, rotational speed pulses, and possibly further magnitudes in accordance with the present invention;

FIG. 10 is a block diagram of a circuit for the pulsed control of a shifting element in accordance with the present invention; and FIG. 11 is a block diagram of a modified circuit for the pulsed control of a shifting element in accordance with the present invention.

Figure 1:
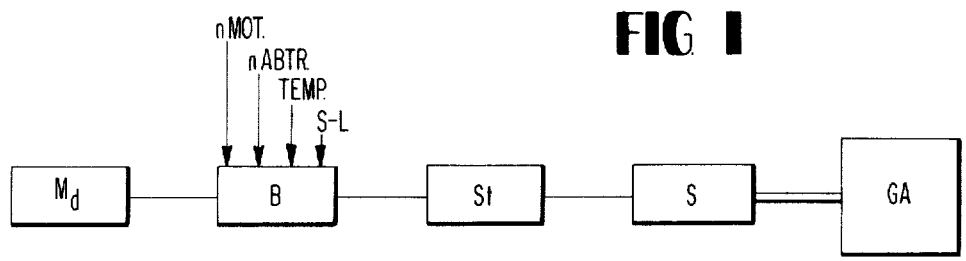
FIG. 1 is a schematic block diagram of a control system in accordance with the present invention.

Referring now to the drawing wherein like reference numerals are used throughout the various views to designate like parts, and more particularly to FIG. 1, according to this figure, a device $M_d$ is provided which determines or detects the torque. The detected, measured value is fed to an evaluation and influencing device B of any conventional construction. The function magnitudes to be considered are fed into this evaluation and influencing device B, such as, for example, the engine rotational speed $n_{Mot}$, the driven or output rotational speed $n_{Abtr}$, the temperature, the influencing of the shifting manner of the transmission S-L, i.e., whether gas is being given rapidly or slowly, etc. For example a function magnitude may be formed of the transmission output rotational speed plus the ratio of the engine rotational speed to transmission output rotational speed and fed to the device B. The thus influenced and corrected measured value is fed to a conventional control stage St which may be in the form of a conventional amplifier. The control stage, in its turn, actuates a conventional shifting member S which in most cases will be a valve, by means of which one can control the passage or flow of the working oil. However, if one utilizes electric, pneumatic or other change-speed transmissions, then the control member S controls corresponding energies. In the case of a hydraulic transmission, the oil pressure now influences in its turn the hydraulic transmission GA.

Figure 2:
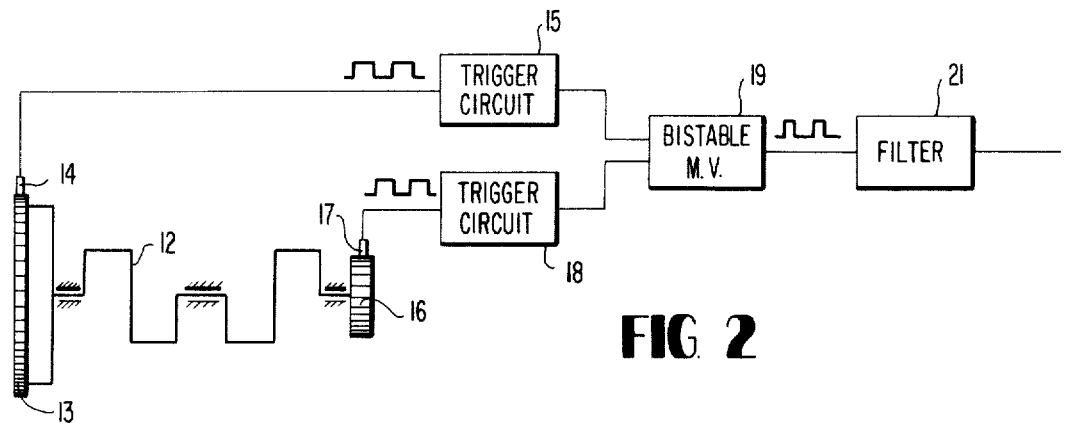
FIG. 2 is a schematic diagram, partly in block diagram, of an apparatus in accordance with the present invention for determining the torsion of a crankshaft and for deriving therefrom the torque.

According to FIG. 2, showing one embodiment for the element $M_d$ of FIG. 1, the elasticity or flexibility of a crankshaft 12 is utilized to detect the torque. To the left end of the crankshaft 12 is provided a starter gear 13, which is non-rotatably connected with the left end of the crankshaft 12 to rotate in unison therewith. Its teeth cooperate with an approximation switching device 14 which may be considered a first signal producing device which produces during each passage of a tooth a pulse signal fed to a trigger circuit 15 of conventional construction. The timing or control chain gear 16 is disposed at and connected to the right end of the crankshaft 12, whose teeth cooperate in a similar manner with an approximation switching device 17 which may be considered a second signal producing device and thereby control a trigger circuit 18. The number of the teeth of the starter gear 13 is a multiple of the number of teeth of the timing control gear 16. The two trigger circuits 15 and 18 in turn control a bistable multivibrator or flip-flop circuit 19 of conventional type and more particularly in such a manner that the trigger 15 flips the multivibrator over into its one stable condition and the trigger 18 into its other stable condition. With an appropriate arrangement of the teeth of the starter gear 13 and of the teeth of the timing gear 16, the multivibrator stage 19 produces a series of pulses whose average value is proportional to the torsion of the crankshaft 12 and therewith to the torque. With increasing torsion, the output pulses of the multivibrator 19 become wider because the teeth of the starter gear 13 switch ever later in time.

A filter or chain of filters 21 follows the multivibrator 19 which produces a D.C. voltage that is proportional to the torque.

Figure 3:
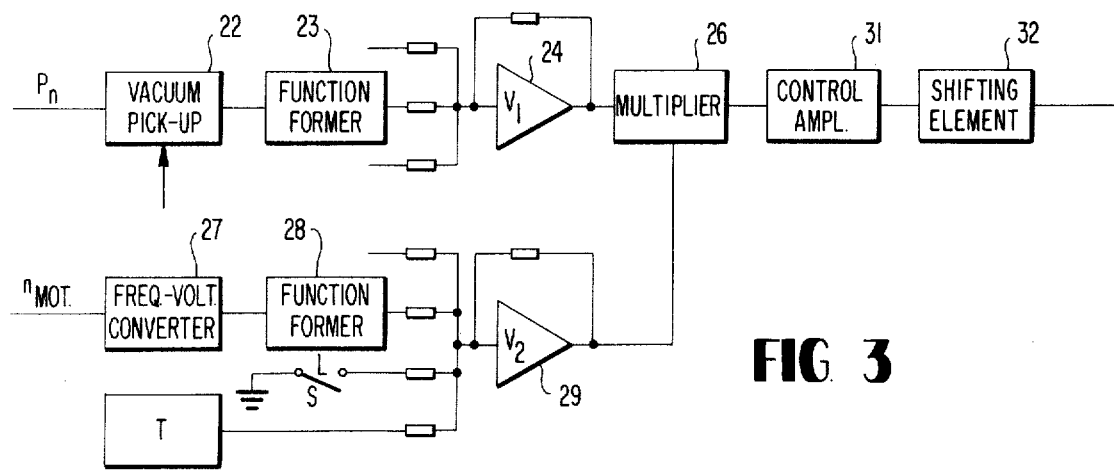
FIG. 3 is a schematic block diagram of an electrical logic circuit network for taking into consideration additive and multiplicative magnitudes, possibly corrected or compensated magnitudes thereof for the control of the working oil pressure in accordance with the present invention.

In the network according to FIG. 3, a conventional vacuum pick-up or transmitter 22 is provided in the suction pipe which produces an electric magnitude proportional to the vacuum. The vacuum transmitter may be either active or also passive. If it involves a passive vacuum transmitter or pick-up, then a separate feed of the transmitter or pick-up must take place. The electrical magnitude is corrected or compensated by a function former 23 of conventional construction which eliminates distortions. For example, a series of biased diodes may be utilized as function former. By suitably biasing these diodes, any desired distortion or deformation can then be achieved between the measured pressure and the signal resulting in the output of the function former 23. This value is fed to a summing or adding amplifier 24 of conventional construction. All those magnitudes are fed to the further inputs of this adding amplifier 24 which are to be only superposed (i.e., added or subtracted).

The thus-corrected value is now applied to a multiplier 26 of conventional construction. All methods and devices customary in analog technology can be utilized for the multiplication such as, for example, the time-division method or also the diode-multiplication.

Those magnitudes are fed to the multiplier 26 which require a multiplication. Thus, for example, the progress of the vacuum against speed, i.e., the curve of the vacuum plotted against rotational speed is not identical with the progress of the torque against speed, i.e., the curve of the torque against rotational speed. Since a torque-dependent control is to take place, the signal derived from the vacuum pick-up 22 has to be changed multiplicatively by the rotational speed. For that purpose, a rotational speed transmitter or pick-up of any known construction is provided at the engine. Different types of rotational speed pick-ups can be used for that purpose, such as, for example, D.C. generators, A.C. generators or pulse generators. If one utilizes a pulse transmitter, then a converter 27 is necessary which converts the frequency into voltage (FSU) and which produces from the pulses a D.C. voltage proportional to the rotational speed. Since the factor is not constant, by means of which the vacuum as a function of rotational speed has to be multiplied, a function former 28 is connected in the output of the converter 27 which produces the required dependency or functional relationship between the output voltage and the fed rotational speed.

However, in addition to the rotational speed, still other magnitudes are fed multiplicatively, such as, for example, the temperature T in the form of an electrical signal. A summing or adding amplifier 29 of conventional construction is therefore provided, which adds to the corrected engine rotational speed, the necessary further magnitudes. The obtained addition signal is now fed to the other input of the multiplier 26 where it is multiplied with the possibly weighted or corrected signal of the vacuum. A signal exists therefore in the output of the multiplier 26 which, with a correct feed of all measured correcting magnitudes, is exactly proportional to the torque progress.

A control stage 31 of any conventional construction is controlled by this signal which amplifies this signal and feeds the same to a shifting member 32.

FIG. 4 illustrates how the torque can be derived from the average indicated pressure of one or several cylinders and the piston travel. According to the formula known as such, one obtains:

$$p_{ml} = 1/S_n \int p(s)ds$$

whereby $p_{ml}$ in indicative of torque, the pressure is indicated by $p$ and the piston travel by $s$, ($S_n$=total travel).

A pressure characteristic value transmitter or pick-up 33 of conventional type indicates the pressure in the cylinder 34. The pressure characteristic value pick-up or transmitter 33 may be, for example, a quartz pressure transducer or a pressure pick-up based on a strain gauge. For achieving the average indicated pressure, one then also has to detect the piston travel $s$. For that purpose, an iron core 37 is provided at a piston 36 which rhythmically immerses or dips into a coil 38. One can either directly conduct the voltage out of the crankcase 39 or one can transmit the voltage out of the crankcase with the aid of the carrier frequency method.

In lieu of measuring on the inside of the crankcase 39, it is also possible to provide an approximately elliptically shaped eccentric 41 which rotates in unison with the crankshaft and whose circumference is detected or followed by an iron core 43 prestressed by a spring 42 in the direction toward the eccentric 41. With its lower end, the iron core 43 immerses into a coil 44 whose signals are conducted off either directly or by means of carrier frequency methods. The eccentric 41 is so constructed that the iron core 43 immerses into the coil 41 as if it were fastened at the piston 36.

The pressure and travel signals are fed to a multiplier 46 while the output thereof is integrated in a low-pass filter 47. One therefore now has a voltage proportional to torque in the output of the low-pass filter 47 which can be further processed in a manner corresponding to FIG. 1.

One can also detect the average indicated pressure from the pressure in the cylinder 34 and the crank angle. One obtains the following relation:

photocell 53. The photocell 53 produces a voltage which corresponds to the functions in square brackets. This function is again fed to a multiplier 54 and the output thereof is fed to a low-pass filter 56.

According to FIG. 5b, the edge of the curved or cam disk 48 can be detected or followed by an inductively operating device 57 of conventional type whereby either passive pick-ups together with a carrier frequency method or active pick-ups with a following integration can be utilized.

Also, the second term of the function in square brackets can be dispensed with without great loss in accuracy. It then suffices to mount at the crankshaft a customary sine-wave generator or sine transmitter as function pick-up. A voltage proportional to torque is then again available in the output of the low-pass filter 56.

According to FIG. 6, also a very simplified determination of the indicated pressure is possible.

It rests in principle on that it is more simple to produce a rectangular function than a sinusoidal function or even a sinusoidal function with higher terms. In FIG. 6, the measured pressure curve $a$, illustrated in FIG. 6a, is multiplied by a rectangular function $b$, illustrated in FIG. 6b so that the curve $c$ of FIG. 6c indicates the approximate average induced pressure. This is realized circuit-wise as follows:

The measured pressure progress $a$ is fed after amplification to the upper input of a switching device 58 which may be of any conventional construction providing an output to an integrating circuit 60. This pressure progress $a$ is also fed to the lower input of the switching device 58 after it has been inverted by an operational amplifier 59.

A cam 61 is provided on the crankshaft or at the flywheel of the engine, which during each passage produces a pulse in a coil 62. This pulse is fed to a bistable multivibrator 63 which in the rhythm of the pulses produced at the coil 62 switches the switching device 58 once toward the upper position and the next time toward the lower position and so on. The switching device 58 is thereby preferably a conventional electronic switch equivalent of and producing the function of the mechanical switch indicated in FIG. 6.

A logic circuit 64 of conventional construction such as an AND gate receives at its one input the pulses of the coil 62 and by way of its other input the pressure progress or curve $a$. Hence, the logic circuit 64 can assure that the switching of the pressure from negative to positive takes place at the upper dead-center position $$P_{ml} = K_1 \int_o^T p(t) [\sin \alpha + K_2 \sin 2 + \ldots] dt$$

The pressure has to be detected again as in FIG. 4. This pressure then has to be multiplied with a function which is composed of the sine of the crank angle $\alpha$ and of the higher terms of the above equation. In practice, however, only the second term is still of importance, i.e., therefore $K_2 \sin 2$. This function is detected according to FIG. 5a by means of a cam disk 48 which is reniform and has its axis of rotation at the cross 49. The cam disk 48 cooperates with a slot 51 provided within a fixed plate (not shown). In the illustrated position, the slot 51 is completely covered off and upon further rotation is more or less opened up. On one side of the slot 51 is provided a light 52 and on the other side a during ignition (and not at the upper dead-center position during overlap of the opening periods of the exhaust and inlet valves).

With multi-cylinder engines, one can assume the conditions in one cylinder as representative of the other cylinders. However, it would also be possible to proceed in the manner indicated above at several or all of the cylinders of the engine.

With an electronic fuel injection system the injection duration represents a measure for the torque of the engine. The injection duration can be utilized with appropriate processing for the control of an automatic transmission.

FIG. 7 illustrates a first solution. In the control apparatus of the electronic injection system of otherwise conventional construction of the type, for example, disclosed in U.S. Pat. No. 3,430,616 issued Mar. 4, 1959, a rectangular signal $U_{ti}$ is available for the control of the injection valve. This signal is electrically picked up or detected and is fed to an integrating amplifier 66 of conventional construction. The output signal of the integrating amplifier 66 begins to rise during the rise of the front flank of a rectangular pulse, and more particularly the higher the longer the duration of the rectangular pulse. As a result thereof, one has replaced the pulse duration by a pulse height. During the pauses, i.e., intervals, the operational amplifier 66 again returns to zero, for example, by means of a suitable discharge resistance so that its output returns to zero, whence its output can run up anew, i.e., rise again upon arrival of the next pulse. However, it is more favorable if one keys the integrating amplifier 66, i.e., if one discharges by means of a conventional switching device 68 the condenser 67 utilized during the integration. To the right of switch 68, the full line curve shows the voltage curve of the output of the integrating amplifier 66 in case it is keyed. The dash lines indicate how the integrating amplifier 66 returns to zero if it is not keyed. The thus-obtained pulse height is now fed to a peak value rectifier 69 which produces in its output a D.C. voltage proportional to the injection duration. The time constant of the peak value rectifier 69 is thereby so selected that it can follow the rotational speed change of the engine. The output voltage of the peak value rectifier 69 is now again fed to an evaluating stage 71 similar or identical to the evaluating stage B of FIG. 1 and the further processing takes place as in FIG. 1.

According to FIG. 8, the injection pulses $U_{ti}$ are fed to a low-pass filter 73, possibly after they have passed through a pulse shaper 72 of any known construction. A voltage $U_1$ approximately equal to $t_i \times n$ results in the output of the low-pass filter 73. Thus, a voltage exists in the output of the low-pass filter 73 which is proportional to the output of the engine. In order to obtain the required torque dependency, this value has to be divided by the rotational speed $n$. This takes place in the quotient former 74 of known construction which consists of a correspondingly connected multiplier. For example, follow-up systems as also the time division method as also diode multipliers may be used as quotient former 74. The rotational speed will be detected, as already described above, for example, by means of pulse transmitters and frequency voltage converters 76. Since also in this case frequently no linear correlation exists, a function generator 77 of conventional construction is connected in the output of the frequency-voltage converter 76. Connected to the output of the function generator 77 is an adding or summing amplifier 78 which receives the outputs of the function generator 77 and to which are fed possibly further correcting magnitudes W. The division by means of the corrected rotational speed now takes place in the quotient former 74 so that a weighted voltage $U_s$ proportional to the injection duration now appears in the output of the quotient former 74. The voltage $U_s$ is then fed to the control amplifier 79. The further processing takes place as in FIG. 7.

FIG. 9 illustrates a time division quotient former. The pulses from the injection control apparatus again reach an operational amplifier 82 after possible preparation by way of a low-pass filter 81. The rotational speed has to be present in this case in the form of a series of pulses. Consequently, a rotational speed pick-up or transmitter has to be used which directly supplies pulses. However, also the pulse sequence of the ignition which is proportional to rotational speed, can be utilized. After a possibly necessary preparation, these pulses control a conventional monostable multivibrator or flip-flop 84 by way of a differentiating element 83. This flip-flop or multivibrator stage 84 permits to change the duration of its output pulses by a further supplied voltage $U_{korr}$. The correction can be derived, for example, from a rotational speed-dependent voltage. For that purpose, the rotational-speed-dependent voltage $U_n$ at the input is processed by way of a pulse former 86, a low-pass filter 87 and a function former 88 into a corresponding corrected D.C. voltage and is fed to the correcting input of the monostable multivibrator 84. Also the correcting magnitudes already described hereinabove can be fed to this input. One thus obtains in the output of the monostable multivibrator stage 84 the rotational speed pulses corrected by the various magnitudes. It is now assumed that the voltage $U_s$ is present in the input of an operational amplifier 91 which is keyed by a switching device 89 of any conventional construction (necessitated by the corrected rotational speed pulses). The keying or switching device 89 which may be of any known construction and is preferably of conventional electronic type, is thus controlled in its keying function by the output of the pulses from the monostable multivibrator 84. This voltage $U_s$ present in the input of the operational amplifier 91 is therefore amplified for such length of time as the operational amplifier 91 is not short-circuited by the switching device 89, i.e., as long as a pulse exists from the monostable multivibrator stage 84, and the amplified voltage $U_s$ is fed to a low-pass filter 92. Consequently, a pulse sequence is present in the input of the low-pass filter 92 whose amplitude is proportional to $U_s$ and whose pulse duration is proportional to $n_{korr}$. A D.C. voltage $U \sim U_s \cdot n_{korr}$ is therefore present in the output of the low-pass filter 92. This voltage U is applied together with the output voltage $U_1$ of the low-pass filter 81 to the two inputs of the operational amplifier 82 which is a difference amplifier of conventional construction, whereby $U_1 \sim t_i \cdot n$.

The following truism $U_s \cdot n_{korr} = U_1$ exists since the operational amplifier 82 modifies the voltage $U_s$ for such length of time until $U_s \cdot n_{korr} = U_1$. The voltage $U_s$ can be calculated therefrom as follows:

$$U_s = U_1/n_{korr} \sim t_i \cdot n/n_{korr} = t_{i\ korr} \sim M_d$$

Even though this solution may appear complicated at first glance in comparison to the preceding solutions, it nevertheless does not mean any increased expenditures compared to the preceding solutions if one takes into consideration that for carrying out the correction a multiplication or quotient formation is necessary anyhow.

If one controls in an analog manner the shifting elements in the form of valves, then one has to produce continuously the current necessary therefor which keeps the valve in the correct position. Additionally, it is also difficult always to make the current so large as corresponds to the desired position of the valve and furthermore the valve for the most part does not have a linear behavior.

FIG. 10 illustrates a simple type of control which avoids these shortcomings. A generator 93 produces an A.C. voltage by means of which a monostable multivibrator stage 94 is controlled. The output pulses thereof are amplified by a power amplifier 96 which produces the pulses for the opening and closing of the valve 97. In order to change the quantity flowing through the valve, the ratio of the opening to closing time has to be changed. This takes place with the aid of the control voltage $U_s$ proportional to the torque. This voltage is fed to the multivibrator stage 94 and changes corresponding to its magnitude the duration of the pulses. If the control voltage $U_s$ is larger; then one obtains a larger through-flow quantity and vice versa, if the control voltage $U_s$ is smaller, then also the through-flow quantity will become smaller.

FIG. 11 illustrates a solution for pulse frequency modulation. In lieu of the change of the duration of the pulses, one can simply also change the number of the pulses and thus change the amount of the through-flow. In that case, the control voltage $U_s$ controls a voltage-dependent frequency generator 98. The output frequency thereof is proportional of the applied control voltage $U_s$ as is known in connection with such frequency generators whose frequency is changed as a function of the applied voltage. A monostable multivibrator circuit 99 is now controlled by means of this frequency obtained in the output of the frequency generator 98, and the further processing now takes place as in FIG. 10 by way of a power amplifier, etc.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. A method for controlling the working oil pressure as a function of torque of an engine for shifting elements of automatically shifted change-speed transmissions comprising the steps of producing a signal having a value representative of torque of the engine, producing at least one function magnitude signal having a value representative of at least one operating characteristic of one of the transmission and the engine, applying the torque signal and the at least one function magnitude signal to logic circuits for controlling the torque signal in accordance with the function magnitude signal to provide an output signal, and applying the output signal to the shifting element for controlling the working oil pressure for the shifting elements of the transmission.

2. A method according to claim 1, characterized in that the function magnitude signal is representative of at least one of transmission output rotational speed, engine rotational speed, and transmission oil temperature.

3. A method acccording to claim 1, characterized in that a plurality of function magnitude signals are produced and are representative of transmission output rotational speed, engine rotational speed, and transmission oil temperature.

4. A method according to claim 2, characterized by the steps of measuring the torsion of a crankshaft of the engine for detecting the torque and feeding the measured signal value to the electric logic circuits together with the at least one function magnitude signal.

5. A method according to claim 2, characterized by the steps of measuring the working pressure in at least one cylinder of the engine as well as the piston travel for determining the torque, combining both measured values with one another for forming a signal value indicative of torque and feeding this torque signal value to the electric logic circuits together with the at least one function magnitude signal.

6. A method according to claim 2, characterized in that a function magnitude signal is produced which is representative of the transmission output rotational speed plus the ratio of engine rotational speed to transmission output rotational speed.

7. A method according to claim 6, characterized by the steps of measuring the torsion of a crankshaft of the engine for detecting the torque and feeding the measured torque signal value to the electric logic circuits together with the at least one function magnitude signal.

8. A method according to claim 6, characterized by the steps of measuring the working pressure in at least one cylinder of the engine as well as the piston travel for determining the torque, combining both measured values with one another for forming a signal value indicative of torque and feeding this torque signal value to the electric logic circuits together with the at least one function magnitude signal.

9. An apparatus for controlling the working oil pressure as a function of torque of an engine for shifting elements of automatically shifted change-speed transmissions, characterized by characteristic value transmitter means including first value transmitter means responsive to at least one operating characteristic of at least one of the engine and transmission for producing a signal representative of torque of the engine and second value transmitter means responsive to at least one operating characteristic of at least one of the engine and transmission for producing at least one function magnitude signal representative of at least one other operating characteristic, logic circuit means being connected to the first and second value transmitter means for controlling the torque signal in accordance with the at least one function magnitude signal to provide an output signal to a shifting element of the transmission, the shifting element being responsive to the output signal for controlling the working oil pressure.

10. An apparatus according to claim 9, characterized in that the second value transmitter means include means producing signals representative of at least one of transmission output rotational speed, engine rotational speed, and transmission oil temperature.

11. An apparatus according to claim 9, characterized in that the engine is provided with a crankshaft, in that the first value transmitter means includes means for measuring the torsion of the crankshaft for producing the torque signal and further including means for feeding the measured value signal to the logic circuit means together with the at least one function magnitude signal.

12. An apparatus according to claim 9, characterized in that the first value transmitter means includes means for measuring the working pressure in at least one cylinder of the engine as well as the travel of a piston within the cylinder for, means for combining both measured values with each other for forming an average value signal representative of torque of the engine of and further including means for feeding said last-mentioned value signal to the logic circuit means together with the at least one function magnitude signal.

13. An apparatus according to claim 9, characterized in that the second value transmitter means includes means producing a function magnitude signal which is representative of the transmission output rotational speed plus the ratio of engine rotational speed to transmission output rotational speed.

14. An apparatus according to claim 9, characterized in that the engine is provided with a crankshaft and in that the first value transmitter means includes means for measuring torque which includes two gears, of which one is arranged near one end of the crankshaft and the other near the other end of the crankshaft, the number of teeth of one gear being a multiple of the number of teeth of the other gear, in that pulse circuit means, bistable multivibrator means and filter means are provided, the teeth of each gear controlling the pulse circuit means producing pulses fed to one respective input of the bistable multivibrator means having two inputs and an output, the output of the bistable multivibrator means being fed to the filter means forming an average value signal representative of torque of the engine.

15. An apparatus according to claim 14, characterized in that one gear is the starter gear and the other gear is the timing control gear.

16. An apparatus according to claim 9, characterized in that function former means are connected in the output of first value transmitter means, the output of the function former means being fed to adding amplifier means and the output of the adding amplifier means being fed to a further operational amplifier means whose output signal is substantially proportional to the torque curve.

17. An apparatus according to claim 16, characterized in that the further operational amplifier means is a multiplier means.

18. An apparatus according to claim 16, characterized in that the further operational amplifier means is a quotient former means.

19. An apparatus according to claim 16, characterized in that the characteristic values in the output of the function former means are corrected prior to application thereof to the input of the adding amplifier means.

20. An apparatus according to claim 9, characterized in that the engine has a crankshaft and at least one cylinder and the first value transmitter means includes a pressure characteristic value transmitter means detecting the pressure progress in the cylinder of the engine for the detection of the average indicated pressure, a piston position characteristic value transmitter means for the detection of the position of a piston in the cylinder, a multiplier means, a low-pass filter means, both transmitter means being connected to feed their outputs to the multiplier means, and in that the low-pass filter means is provided for integrating the output signal of the multiplier means.

21. An apparatus according to claim 20, characterized in that the piston position characteristic value transmitter means includes a coil fixed relative to the engine, into which immerses an iron core secured at the piston.

22. An apparatus according to claim 20, characterized in that the piston position characteristic value transmitter means includes an eccentric on the outside of the engine which rotates in unison with the crankshaft of the engine, and in that the eccentric actuates an iron core immersing in a coil.

23. An apparatus according to claim 20, characterized in that the piston position characteristic value transmitter means indicates the crank angle of the crankshaft of the engine.

24. An apparatus according to claim 23, characterized in that a substantially reniform cam disk rotates in unison with the crankshaft whose edge at least a portion of covers a slot means depending on the position of the cam disk, and that a photocell is provided on one side of the slot means and a lamp on the other side of the slot means.

25. An apparatus according to claim 23, characterized by a carrier frequency means for detecting the edge of the cam disk.

26. An apparatus according to claim 20, characterized in that a pulse circuit means is provided producing a pulse during each rotation of the crankshaft, and an AND stage is provided whose one input is connected with the pulse circuit means and whose other input is connected with the pressure characteristic value transmitter means, the input of a bistable multivibrator means being controlled by the output of the AND stage and the other input of the multivibrator means being controlled by said pulse circuit means, a switching means being controlled by the output of the multivibrator means and having two further inputs, the pressure characteristic value transmitter means being connected to one further input of the switching means and an inverted pressure characteristic value signal being applied to the other input thereof, and integrating means connected in the output of the switching means.

27. An apparatus according to claim 9, characterized in that the first value transmitter means includes means providing a signal proportional to a rectangular signal derived from a control device for an electronic injection system and feeding the signal to an integrating amplifier means and a peak value rectifier means is connected to the output of the integrating amplifier means.

28. An apparatus according to claim 27, characterized in that the integrating amplifier means is a keyed amplifier reset after each pulse.

29. An apparatus according to claim 9, characterized in that a low-pass filter means and a quotient former means are provided and in that the first value transmitter means includes means providing a signal proportional to a rectangular signal derived from a control device for an electronic injection system and feeding the signal to the low-pass filter means producing in its output an output voltage $U = t_i \cdot n$ which is fed to an input of the quotient former means, and an engine rotational speed characteristic value transmitter means providing a voltage proportional to engine rotational speed to another input of the quotient former means.

30. An apparatus according to claim 29, characterized in that a linearizing function former means is connected between the engine rotational speed characteristic value transmitter means and the quotient former means.

31. An apparatus according to claim 29, characterized in that an adding amplifier means which is connected in the another input of the quotient former means, has several inputs to which are fed other function magnitudes signal.

32. An apparatus according to claim 9, characterized in that first and second low-pass filter means, a differentiating element, a difference amplifier means and an operational amplifier means are provided and in that the first value transmitter means includes means providing a signal representative of a rectangular signal derived from a control device for an electronic injection system and feeding the signal by way of the first low-pass filter means to one input of the difference amplifier means, an engine rotational speed transmitter means operating in pulsed operation being connected to the differentiating element, a monostable multivibrator means being connected in the output of the differentiating element, an on-off switch means being connected in the output of the monostable multivibrator means which keys the operational amplifier means, and the second low-pass filter means being provided between the output of the operational amplifier means and another input of the difference amplifier means.

33. An apparatus according to claim 9, characterized in that the logic circuit means includes an A.C. generator means, monostable multivbrator means, and amplifier means, the A.C. generator means controlling the monostable multivibrator means which produces pulses of predetermined duration, the multivibrator means including a second input which is fed with a voltage proportional to the torque, and the output of the multivibrator means controlling the amplifier means which in turn controls the shifting element.

34. An apparatus according to claim 9, characterized in that the logic circuit means includes a frequency generator means, a monostable multivibrator means and an amplifier means and in that a voltage signal proportional to torque is applied to the logic circuit means and is applied to the input of the frequency generator means producing a frequency as a function of applied voltage signal, the generator means controlling the monostable multivibrator means whose output is fed to the amplifier means which controls the shifting element.

* * * * *